United States Patent [19]

Pearl

[11] Patent Number: 4,574,673
[45] Date of Patent: Mar. 11, 1986

[54] STIFFENED CUTTING BLADE WITH REVERSIBLE REPLACEABLE EDGE MEMBER

[76] Inventor: David R. Pearl, 20 Hamlin Dr., West Hartford, Conn. 06117

[21] Appl. No.: 715,513

[22] Filed: Mar. 25, 1985

[51] Int. Cl.[4] .............................................. D06H 7/00
[52] U.S. Cl. ........................................ 83/697; 83/698; 83/925 CC; 30/273; 30/349
[58] Field of Search .................. 83/697, 698, 925 CC; 30/273, 275, 349

[56] References Cited

U.S. PATENT DOCUMENTS

| | | | |
|---|---|---|---|
| 1,299,536 | 4/1919 | Appelbaum | 30/275 |
| 1,310,853 | 7/1919 | Appelbaum | 30/275 |
| 1,567,099 | 12/1925 | Appelbaum | 30/275 |
| 3,772,955 | 11/1973 | Pearl | 83/925 CC |

Primary Examiner—James M. Meister

[57] ABSTRACT

A stiffened elongated cutting blade for use in a cutting apparatus of the type employing an elongated cantilevered cutting blade for cutting layups of fabric or other similar sheet material, and reciprocated along its longitudinal axis when actively cutting. The blade is a compound part made up of an inexpensive, reversible and replaceable edge member insert which provides the cutting edge and an associated holder supporting the insert for substantially its entire length along its rear edge and serving to reduce lateral and rearward deflections. The insert is held in the holder by a mechanical interfit between the insert and holder at its lower end and in mechanical engagement with the holder at its upper end and is easily releasable from the holder to allow its reversibility and replacement after the cutting edge has dulled or worn beyond a desireable point.

13 Claims, 10 Drawing Figures

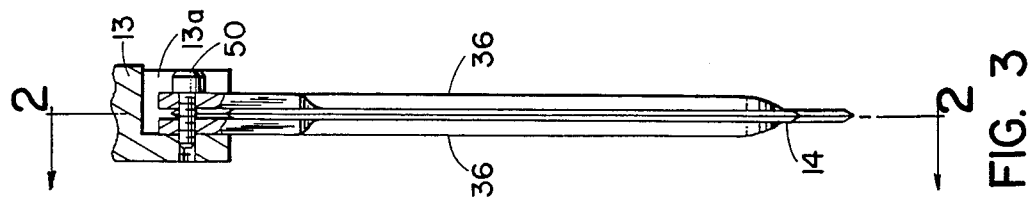
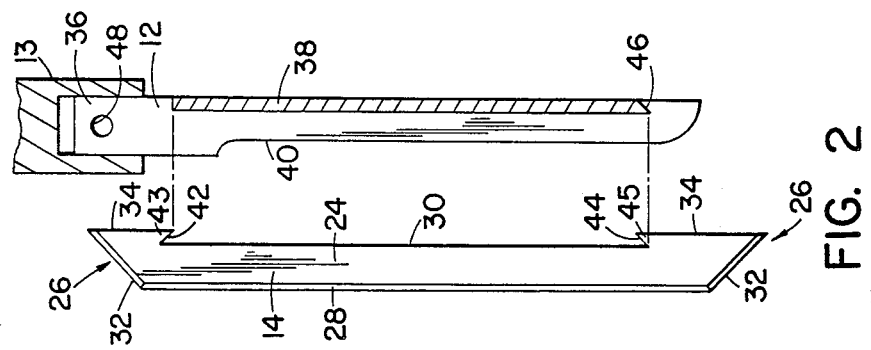
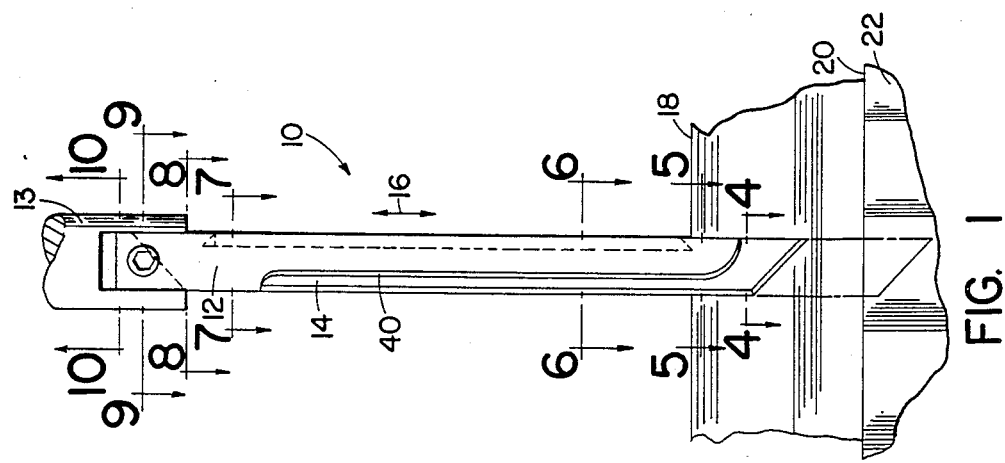

STIFFENED CUTTING BLADE WITH REVERSIBLE REPLACEABLE EDGE MEMBER

BACKGROUND OF THE INVENTION

The present invention relates to cutting blades for use in a cutting apparatus of the type employing an elongated canti levered cutting blade and used for cutting layups of sheet material and the like, and deals more particularly with a cutting blade which is of an improved construction having an inexpensive reversible - replaceable edge member insert and an associated insert holder so that the blade remains relatively stiff and is therefore less subject to producing cutting errors arising from lateral or rearward deflection of its lower end.

One type of cutting apparatus used for cutting garment and upholstry fabric and similar sheet materials, as shown for example by U.S. Pat. No. 3,548,697, uses an elongated cutting blade which is part of a cutter moved over the top of a layup of sheet material to cause the cutting blade to follow a desired line of cut, the cutting blade being attached at its upper end to the remainder of the cutter and extending downwardly therefrom in cantilevered fashion through the layup of sheet material and being reciprocated vertically along its longitudinal axis while actively cutting. In such an apparatus, some means, such as a penetrable supporting bed is provided to allow the lower end of the blade to extend downwardly beyond the lower surface of the layup during at least a portion of each of its strokes. Because the cutting blade is cantilevered, forces which are imposed on the lower end portion of the blade by the material being cut, and which are usually laterally or rearwardly directed, tend to deflect the lower end of the blade away from its desired position and, especially when the layup is relatively thick, unacceptable cutting errors may be produced by such deflection with the result that a piece cut from an upper layer of the layup will not exactly match a piece cut from the bottom layer.

One way to reduce the deflection of the blade is to make it from a very stiff material such as tungsten carbide. This has the problem however that tungsten carbide is generally difficult to sharpen and although the edge produced may be suitable for cutting many materials, it may not be of the best character for cutting the material in question because the sharpened edges formed on tungsten blades are generally slightly duller than those produced on blades made of some other materials. The generally preferred material for producing a sharp cutting edge is steel; however, steel has a relatively low modulus of elasticity so that a blade made entirely of steel often deflects an undesireable amount unless it is made of an undesireably large cross-section.

Another way to reduce blade deflection is to use a stiffened cutting blade of the type, as shown for example by my U.S. Pat. No. 3,772,955 and assigned to the same assignee as the present invention, in which an elongated edge member is made of a readily sharpenable material and a strengthening rib is made of a relatively stiff material, the rib being releasably attached to the edge member to stiffen the lower portion of the blade. The blade is assembled and disassembled by flexing the edge member in the proper manner to "snap" the rib into and out of its operative engagement with the edge member. The edge member may be repeatedly sharpened until it is worn beyond a desireable point at which time it must be replaced. A drawback to this type of blade is that the edge member, which is the replaced member of the assembly, is relatively costly. A further drawback is that the assembly and disassembly of the blade may be difficult and awkward since the edge member must be flexed in a specific manner to "snap" the stiffening rib into and out of engagement with the edge member.

The object of the present invention is, therefore, to provide a cutting blade for use in a cutting apparatus of the type employing an elongated cantilevered cutting blade reciprocated along its longitudinal axis and which cutting blade is both stiff to reduce deflection of its unsupported end and uses a low cost, disposable edge member insert having a cutting edge of a desireable sharp character.

A further object of the invention is to provide a cutting blade of the foregoing character which uses an end-for-end reversible edge member insert and a reusable stiffening holder made of a relatively stiff material, the edge member insert being easily releaseable from the holder to allow its reversibility and replacement after the edge has dulled or worn beyond a desireable point.

Other features and advantages of the present invention will become readily apparent from the following written description and the drawings forming a part thereof.

SUMMARY OF THE INVENTION

In accordance with the present invention a stiffened cutting blade for use in a cutting apparatus used for cutting layups of fabric or other sheet material and of the type which employs an elongated cantilevered cutting blade reciprocated along its longitudinal axis when actively cutting is presented. The cutting blade is a compound part made up of an elongated edge member insert and a holder. The insert has two generally parallel side faces, two longitudinally opposite end sections, a longitudinally extending rear edge extending between the two opposite end sections and a longitudinal front edge sharpened along at least a portion of its length and at both ends so that the insert may be reversed end-for-end when the cutting edge of one end section is dulled or worn beyond a desireable point. The holder receives and stiffens the insert and has one end which attaches to a driver and a longitudinally opposite piercing end, and two side portions each engaging a respective one of the blade insert side faces and each of which has a longitudinally extending forward edge located a distance rearwardly of the front edge of the edge member insert so that the insert front edge projects a substantial distance forwardly beyond the holder forward edge along the length of the piercing end of the holder and wherein one of the insert end sections projects downwardly beyond the holder. The holder is made of a material, such as Maraging steel, having a hardness and toughness suitable for supporting the insert with minimum deflection during cutting and which material is also substantially tougher than the material of the edge member insert; and the edge member insert is made of a material, which may be ultra-hard and brittle and preferably M-2 high speed tool steel or tungsten carbide, providing a more ideal cutting edge than the material of the holder. Additionally, the insert is attached to the holder by means which allow the insert to be releasably removed from the holder. The means for releasably fixing the insert to the holder includes a mechanical interfit between the insert and the holder at the piercing end and a mechanical engagement which locks the end of the insert between the holder's upwardly extending side portions at the driver attaching end and which allows the insert to be easily moved into and out of assembly with the holder.

BRIEF DESCRIPTION OF THE DRAWINGS

FIG. 1 is a side elevational view of a cutting blade embodying the invention, the solid lines showing the blade in the upper extent of its reciprocating movement and the broken lines showing the blade in the lower extent of its reciprocating movement, this figure also showing a schematic fragmentary view of a reciprocating driver attachment that is not a part of the invention.

FIG. 2 is an exploded sectional view on the lines 2—2 of the blade of FIG. 3.

FIG. 3 is a front view of the cutting blade of FIG. 1.

DETAILED DESCRIPTION

Figure 7:
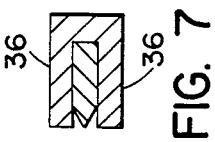
FIG. 7 is a transverse sectional view, drawn on a scale slightly enlarged from that of FIG. 1 taken on the line 7—7 of FIG. 1.
Figure 6:
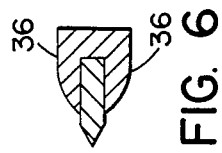
FIG. 6 is a transverse sectional view, drawn on a scale slightly enlarged from that of FIG. 1 taken on the line 6—6 of FIG. 1.

Turning now to FIG. 1, a stiffened cutting blade embodying the present invention is shown therein and is indicated generally by the numeral 10. The blade 10 is comprised of an elongated stiffening holder 12 and an elongated edge member insert 14, the insert being releasably fixed to the holder to form them into a single unit. The insert 14 is symmetrical end-to-end and may be reversed in the holder when the cutting edge of one end section is dulled or worn beyond a desireable point. The upper end of the holder 12 is adapted to be connected to the driver 13 of a cutter which is not part of the present invention but is included in the drawings for illustrative purposes and which reciprocates the blade vertically, as seen in FIG. 1, along its longitudinal axis, as indicated by the arrow 16.

In FIG. 1, a layup of sheet material to be cut by the cutting blade 10 is indicated at 18 and is supported on the upper surface 20 of a bed 22 of penetrable material. The solid lines show the blade 10 in the upper limit of its stroke when in cutting relationship with the layup 18 and the broken lines show the blade in the lower extent of its stroke. From this it will be noted that during at least a portion of the stroke the lower or piercing end of the edge member insert 14 penetrates and extends downwardly beyond the supporting surface 20 of the bed 22. The holder 12 and insert 14 may also be raised from the free line position shown in FIG. 1 relative to the layup 18 to a position at which the blade is entirely out of cutting relationship with the layup. That is, at such a raised position the lower end of the edge member insert 14, in the lowermost extent of its stroke is located above the layup so that the blade 10 may be moved to a new point on the layup to start a new cut without cutting the layup during its movement to the new position.

Considering now the invention in greater detail and referring to FIGS. 1 to 10, the blade 10 comprises the edge member insert 14, viewed best in FIG. 2, and the stiffening holder 12. The insert 14 has two side faces 24, 24 generally parallel to one another, two longitudinally opposite end sections 26, 26, a front edge 28, and a rear edge made up of two end section rear edges 34, 34 and a relieved portion edge 30, and two shoulders 42 and 44. The front edge 28 is sharpened along at least a portion of its length at both ends and preferably along its entire length as shown, and each end section 26, 26 of the insert 14 includes a sharpened edge 32 which intersects with its respective end section elongated rear edge 34, to form a downwardly directed point at the blade's lower end when the member insert 14 is assembled with the holder 12. Each end section elongated rear edge 34, is located a distance rearwardly of the relieved portion edge 30 and each shoulder extends in an inclined and undercut fashion from its associated end section rear edge 34 to the edge 30 to provide the insert with an associated barb or tail 43 or 45. Thus, the rear portions of the insert 14 includes a forwardly relieved portion defined by its edge 30 and the shoulders 42 and 44.

The holder 12 includes two spaced side portions 36, 36 which engage the respective side faces 24, 24 of the insert 14 and which are connected to one another along a major portion of their length by a spine portion 38 located rearwardly of the insert edge 30. The side portions 36, 36 have elongated forward edges 40, 40 a portion of which are located a substantial distance rearwardly of the insert front edge 28 so that the insert projects a substantial distance forwardly beyond the holder along the lower length of the holder. Additionally, the side portion 36, 36 are feathered to smoothly blend with the side faces 24, 24 of the edge member insert 14 to allow the holder to move as easily as possible through the material being cut.

Figure 5:
FIG. 5 is a transverse sectional view, drawn on a scale slightly enlarged from that of FIG. 1 taken on the line 5—5 of FIG. 1.
Figure 4:
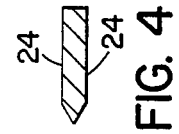
FIG. 4 is a transverse sectional view, drawn on a scale slightly enlarded from that of FIG. 1 taken on the line 4—4 of FIG. 1.
Figure 10:
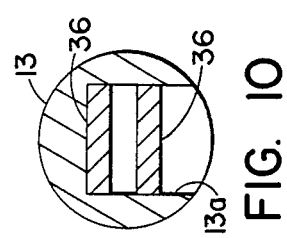
FIG. 10 is a transverse sectional view, drawn on a scale slightly enlarged from that of FIG. 1 taken on the line 10—10 of FIG. 1.
Figure 9:
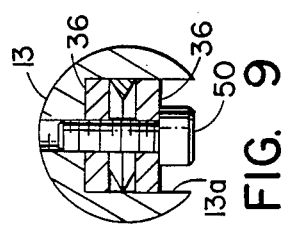
FIG. 9 is a transverse sectional view, drawn on a scale slightly enlarged from that of FIG. 1 taken on the line 9—9 of FIG. 1.
Figure 8:
FIG. 8 is a transverse sectional view, drawn on a scale slightly enlarged from that of FIG. 1 taken on the line 8—8 of FIG. 1.

The holder spine 38 has a generally forwardly and downwardly extending bottom shoulder 46 to engage the lower insert shoulder 44 when the insert and holder are in their assembled condition. The length of the spine 38 is substantially equal to that of the rear insert edge 30 so that the insert 14 is rearwardly supported by the spine along a substantial portion of its length. The two side portions 36, 36 of the holder 12 extend downwardly below the bottom holder shoulder 46, as best shown in FIGS. 1 and 2, and terminate rearwardly in line with the associated insert edge 34. The spine portion 38 of the holder 12 in turn has a rear edge aligned with the insert edges 34, 34 so that below the shoulder 44 and above the shoulder 42 the insert 14 and the holder 12 terminate in a common plane as shown in FIGS. 5 and 8. The holder side portions 36, 36 extend upwardly beyond the upper end of the insert when the insert and holder are assembled with one another, and upwardly beyond the upper end of the spine 38 they are free of one another and may be moved toward one another to frictionally engage the upper portions of the side faces 24, 24 of the insert 14 to aid in holding the insert to the holder. The holder upper side portions may be moved toward one another by inserting a clamping screw 50 through a cutout portion 13a of the driver 13, as shown in FIGS. 1, 3 and 9, through holes 48, 48 and screwing the screw into the driver 13 to draw the side portions 36, 36 together to squeeze the upper portions of the insert side faces 24, 24.

In some instances, the rearwardly directed forces imposed on the lower end of the blade 10 by the material being cut may tend to move the upper end of the insert 14 forwardly relative to the holder 12. To overcome such forward movement of the insert 14, the oppositely aligned holes 48, 48 in the side members 36, 36 are located so that the clamping screw 50 and the insert 14 are in mechanical engagement to lock the end of the insert between the side members and to restrain the insert against forward movement.

The edge member insert 14 is made of a material which may be ultra-hard and brittle and preferably M-2 high speed tool steel or tungsten carbide which is sharpened to produce a good quality cutting edge. A tungsten carbide blade has the advantage of providing a longer lasting edge when compared to some other materials; however, it is generally more expensive, more difficult to sharpen and may not be suitable for cutting the material in question. When M-2 high speed tool steel is used as the insert material, it is hardened to a hardness ranging from 60 to 70 Rockwell C. The holder 12 in turn is made of a material substantially tougher than the insert material and is stiffer than the insert because of its configuration and larger cross-sectional area. Preferably, the holder material is steel, such as Maraging steel or other tool steel having a hardness and toughness suitable for supporting the insert 14 with minimum deflection during cutting. The holder material is hardened to a hardness ranging from 50 to 70 Rockwell C. Preferably, when both the insert and holder material is M-2 high speed tool steel, the insert is hardened to a hardness ranging from 64 to 66 Rockwell C and the holder steel is hardened to a hardness ranging from 58 to 60 Rockwell C.

Hardness, stiffness and toughness as used herein describe a material's properties and characteristics and are defined as follows. The hardness of a material is a relative quantity and is characteristic of the material's ability to resist abrasions and indentations. Stiffness is measured by the material's modulus of elasticity and is the property which enables a material to resist deformation. Toughness is the property of a material which characterizes its ability to withstand without fracture large stresses accompanied by large deformations.

A stiffened cutting blade having a holder and an associated low cost, reversible-replaceable edge member insert for use in a cutting apparatus of the type employing an elongated cantilevered cutting blade reciprocated along its longitudinal axis has been described in a preferred embodiment; however, numerous changes and modifications made be had without departing from the spirit of the invention. Therefore, the invention has been described by way of illustration rather than limitation.

I claim:

1. A stiffened cutting blade for use in a cutting apparatus of the type employing an elongated cantilevered cutting blade reciprocated along its longitudinal axis, said cutting blade comprising:

an elongated edge member insert having two generally parallel side faces, two longitudinally opposite end sections each having a rear edge, a longitudinally extending rear edge, said rear edge including said end section rear edges and a forwardly relieved edge portion extending between said two opposite end sections, and a longitudinally extending front edge sharpened along at least a portion of its length at both ends, holder means for receiving and stiffening said edge member insert, said holder means having a driver attaching end and a longitudinally opposite piercing end and two spaced apart side portions each engaging a respective one of said side faces of said edge member insert and each having a longitudinally extending forward front edge located a distance rearwardly of said front edge of said edge member insert so that said insert front edge projects a substantial distance forwardly beyond said holder forward front edge along the lower length of said holder means and a one of said edge member insert end sections projecting downwardly beyond said holder means at said piercing end, and means for releasably fixing said edge member insert to said holder to form them into a single unit;

said holder being made of a material and having a cross-sectional area larger than said insert cross-sectional area so that said holder is substantially stiffer than the material of said edge member insert and said edge member insert being made of a material substantially more suitable for a cutting edge than the material of said holder;

said holder means including a longitudinally extending spine portion located rearwardly of said edge member insert forwardly relieved edge portion and connecting said two side portions to one another along at least a portion of their length extending from said piercing end to said driver attaching end for a distance substantially equal to said insert rear edge forwardly relieved edge portion, said forwardly relieved edge portion receiving said spine, and said holder two side portions extending upwardly above the other of said edge member insert opposite end sections;

said means for releasably fixing said edge member insert to said holder means comprising a generally rearwardly and downwardly extending shoulder on said edge member insert defining the upper limit of said forwardly relieved edge portion and a generally rearwardly and upwardly extending shoulder defining the lower limit of said forwardly relieved edge portion, and said spine having at its lower end a forwardly and downwardly extending shoulder, said shoulder of said spine being engageable with a one of said shoulders of said edge member insert when said insert is inserted in a first direction and with the other of said shoulders of said insert when inserted in a second direction when said insert and holder are in their normal assembled condition, and means for moving said upwardly extending side portions toward one another and into mechanical engagement with said other of said edge member insert end sections when said edge member insert and said holder are in said assembled condition.

2. A stiffened cutting blade as defined in claim 1 further characterized by said edge member insert opposite end sections each having an elongated rear edge located a distance rearwardly of said forwardly relieved edge portion of said insert rear edge and aligned with said insert rear edge.

3. A stiffened cutting blade as defined in claim 2 further characterized by said edge member insert end section elongated rear edge which below said spine is aligned with the rear edge of said holder.

4. A stiffened cutting blade as defined in claim 2 further characterized by said edge member insert end section elongated rear edge which above said spine is aligned with the rear edge of said holder.

5. A stiffened cutting blade as defined in claim 1 further characterized in that said edge member insert material is M-2 high speed tool steel.

6. A stiffened cutting blade as defined in claim 5 further characterized by said M-2 high speed tool steel being hardened to a hardness ranging from 62 to 70 Rockwell C.

7. A stiffened cutting blade as defined in claim 1 further charcterized by said edge member insert being made of tungsten carbide.

8. A stiffened cutting blade as defined in claim 1 further characterized in that said holder material is steel.

9. A stiffened cutting blade as defined in claim 8 further characterized in that said holder material is heat treated to a toughness higher than the toughness of said edge member insert material.

10. A stiffened cutting blade as defined in claim 8 further characterized by said holder material hardness having a hardness ranging from 50 to 70 Rockwell C.

11. A stiffened cutting blade as defined in claim 8 further characterized in that said holder material is Maraging steel.

12. A stiffened cutting blade as defined in claim 8 further characterized in that said holder material is M-2 high speed tool steel.

13. A stiffened cutting blade as defined in claim 1 characterized in that said holder material and said insert material is M-2 high speed tool steel, said holder material being hardened to a hardness ranging from 58 to 60 Rockwell C and said insert material being hardened to a hardness ranging from 64 to 66 Rockwell C.

* * * * *